US010922969B2

(12) United States Patent
Song et al.

(10) Patent No.: US 10,922,969 B2
(45) Date of Patent: Feb. 16, 2021

(54) SYSTEMS, METHODS AND APPARATUSES FOR DETECTING ELEVATED FREEWAYS TO PREVENT ENGAGING CRUISE FEATURES

(71) Applicant: GM GLOBAL TECHNOLOGY OPERATIONS LLC, Detroit, MI (US)

(72) Inventors: Xiaofeng F. Song, Novi, MI (US); Haley M. Dalzell, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 15/996,882

(22) Filed: Jun. 4, 2018

(65) Prior Publication Data

US 2019/0371170 A1 Dec. 5, 2019

(51) Int. Cl.
*G05D 1/00* (2006.01)
*G08G 1/0967* (2006.01)
*G05D 1/02* (2020.01)

(52) U.S. Cl.
CPC ..... *G08G 1/096725* (2013.01); *G05D 1/0061* (2013.01); *G05D 1/0088* (2013.01); *G05D 1/0257* (2013.01); *G05D 1/0278* (2013.01)

(58) Field of Classification Search
CPC .......... G08G 1/096725; G05D 1/0257; G05D 1/0278; G05D 1/0061; G05D 1/0088
See application file for complete search history.

(56) References Cited

U.S. PATENT DOCUMENTS

| 8,082,096 B2* | 12/2011 | Dupray | G08G 1/096811 701/465 |
| 10,324,463 B1* | 6/2019 | Konrardy | G06Q 40/08 |
| 10,354,527 B2* | 7/2019 | Dimeo | B60W 40/09 |
| 2006/0276201 A1* | 12/2006 | Dupray | H04L 67/18 455/456.1 |
| 2008/0027591 A1* | 1/2008 | Lenser | G05D 1/0251 701/2 |
| 2008/0033645 A1* | 2/2008 | Levinson | G01C 21/20 701/469 |
| 2017/0227970 A1* | 8/2017 | Taguchi | G01S 19/48 |
| 2018/0024562 A1* | 1/2018 | Bellaiche | G06T 7/73 701/26 |
| 2018/0025235 A1* | 1/2018 | Fridman | G08G 1/096708 382/103 |
| 2018/0107226 A1* | 4/2018 | Yang | G05D 1/0246 |
| 2018/0130347 A1* | 5/2018 | Ricci | G08G 1/0112 |

* cited by examiner

Primary Examiner — Truc M Do
(74) Attorney, Agent, or Firm — Lorenz & Kopf, LLP

(57) ABSTRACT

Systems, Methods and Apparatuses are provided to control actuation of an autonomous operating mode feature of a vehicle to operate when the vehicle is on a limited access freeway. The elevated freeway detection system includes: receiving, by an evaluation module, a plurality of data in real-time about the vehicle including: mapping, GPS and radar data of the vehicle to provide at least a current vehicle location and image data to capture surroundings of the vehicle; determining, whether the vehicle is mapped on a limited access freeway by computing a matching probability location data of the vehicle to the limited access roadway based on the map data, radar data and GPS data; and sending a signal to inhibit the autonomous feature from engaging in the vehicle when the vehicle is not on the limited access freeway.

20 Claims, 9 Drawing Sheets

SYSTEMS, METHODS AND APPARATUSES FOR DETECTING ELEVATED FREEWAYS TO PREVENT ENGAGING CRUISE FEATURES

BACKGROUND

The technical field generally relates to engaging cruise features in a vehicle, and more particularly relates to systems, methods and apparatuses to determine vehicle operations under elevated freeways to prevent activation of autonomous cruise applications.

An autonomous or semi-autonomous assisted vehicle is a vehicle that is capable of sensing its environment and navigating with little or no user input. An autonomous or semi-autonomous vehicle senses its environment using one or more sensing devices such as radar, lidar, image sensors, and the like. The autonomous vehicle system further uses information from global positioning systems (GPS) or any Global Navigation Satellite System (GNSS) technology, navigation systems, vehicle-to-vehicle communication, vehicle-to-infrastructure technology, and/or drive-by-wire systems to navigate the vehicle. The capabilities of environment sensing of an autonomous as well as a semi-autonomous or for that matter a conventional driver assisted vehicle would be enhanced with elevated freeway detection based on vehicle attribute analysis. That is, the capabilities of improved environment sensing benefit all types of vehicles currently in use or in future use and may even have remote applicability to non-vehicle applications.

Accordingly, it is desirable to incorporate elevated freeway analysis based on vehicle operational attributes in autonomous features for a vehicle to prevent improper engagement of a cruise automation on local streets. In addition, it is desirable to provide elevated freeway detection systems, methods and apparatuses for autonomous, semi-autonomous and conventional vehicles. Furthermore, other desirable features and characteristics of the present invention will become apparent from the subsequent detailed description and the appended claims, taken in conjunction with the accompanying drawings and the foregoing technical field and background.

SUMMARY

Systems, methods and apparatuses for detecting elevated freeways and for engaging or not engaging an autonomous cruise feature are provided.

In one embodiment, an elevated freeway detection system for controlling actuation of an autonomous operating mode feature of a vehicle to operate when the vehicle is on a limited access freeway is provided. The elevated freeway detection system includes: a plurality of sensors of the vehicle that generate a plurality of sensed data about the vehicle, wherein the plurality of data at least includes: map data from a local map database of a mapped location, and sensed position data of a global positioning system (GPS) data and of a radar of data of the vehicle; an evaluation coupled to the plurality of sensors to receive the sensed data to compare the mapped location to the sensed position data by a set of comparisons of the map data to the radar and the map data to the GPS data to determine a set of factors wherein each factor of the set of factors is dynamically weighted to compute a matching probability between the mapped location and the sensed position data wherein the matching probability includes: a sum of each dynamically weighted factor; and a summing module to sum each dynamically weighted factor to generate a summed result for comparison to a threshold wherein if the summed result exceeds the threshold then the evaluation module generates a signal to inhibit an autonomous operating mode feature in the vehicle from engaging as the vehicle by virtue of the summed result exceeding the threshold, the vehicle is deemed not to be operating on the limited access freeway.

In various embodiments, the elevated freeway detection system, further includes: receiving, by the evaluation module, image data from a camera of the vehicle for capturing images surrounding the vehicle. The elevated freeway detection system further includes: detecting, by the evaluation module, image data of a pedestrian by the camera of the vehicle when performing a pedestrian detection operation to determine whether the vehicle is on a local roadway by virtue of detected pedestrian traffic. The elevated freeway detection system further includes: determining, by the evaluation module from radar data, a road type by receiving radar data from a long range radar directed to the road surface for capturing radar data of the road surface. The elevated freeway detection system further includes: a weighting module processing the dynamically weighted factors wherein the dynamically weighted factors include: a first factor of a pedestrian detection from the image data; a second factor of a road type determination from radar data for determining the road type is a limited access freeway; a third factor of a comparison of the radar data and the map data for determining a tunnel within a vicinity of the vehicle; and a fourth factor of a comparison of the map data and GPS data for determining an elevated freeway location with a particular distance from the vehicle. The first, second, third and fourth factors are assessed by the weighting module to generate results used to determine whether or not to inhibit the engaging of the autonomous operating mode feature. The elevated freeway detection system, further includes: a controller for controlling the weighting module and to switch a mode of operation of the autonomous operating mode feature of the vehicle based on results from an evaluation of the GPS data and an estimation error data of the vehicle. The elevated freeway detection system wherein if the summed result does not exceed the threshold then the evaluation module generates a signal to enable an autonomous operating mode feature of the vehicle to engage in the vehicle by virtue of the summed result not exceeding the threshold, the vehicle is deemed to be operating on the limited access freeway.

In another embodiment, a method to detect an elevated freeway for controlling actuation of an autonomous operating mode feature of a vehicle for operating when the vehicle is on a limited access freeway is provided. The method includes the steps of: receiving, by an evaluation module disposed within the vehicle, a plurality of data about the vehicle at least includes: map data from a local map database of a mapped location, and sensed position data from a global positioning system (GPS) data and from a radar of data of the vehicle of a sensed vehicle location; comparing, by the evaluation module, the mapped location to the sensed position location by a set of comparisons of the map data to the radar data and GPS data to map data to determine a set of factors wherein each factor of the set of factors is dynamically weighted to compute a matching probability between the mapped location and the sensed location wherein the matching probability includes a sum of each dynamically weighted factor; and summing each dynamically weighted factor to generate a summed result for comparison to a threshold wherein if the result exceeds the threshold then the evaluation module generates a signal to inhibit an autonomous operating mode feature in the vehicle from engaging as the vehicle by virtue of the summed result exceeding the threshold, the vehicle is deemed not to be operating on the limited access freeway.

In various embodiments, the method further includes: receiving, by the evaluation module, image data from a camera of the vehicle for capturing images surrounding the vehicle. The method further includes: detecting, by the evaluation module, image data of a pedestrian by the camera of the vehicle when performing a pedestrian detection operation to determine whether the vehicle is on a local roadway by virtue of detected pedestrian traffic. The method further includes: determining, by radar, a road type by receiving data from a long range radar directed to the road surface for capturing data of the road surface. The method further includes: determining, by the evaluation module from radar data, a road type by receiving radar data from a long range radar directed to the road surface for capturing radar data of the road surface. The method further includes: processing by a weighting module the dynamically weighting by factors by: detecting, by a first factor, a pedestrian detection from the image data; determining, by a second factor, a road type determination from radar data for determining the road type is a limited access freeway; comparing, by a third factor, a comparison of the radar data and the map data for determining a tunnel within a vicinity of the vehicle; and comparing, by a fourth factor, a comparison of the map data and GPS data for determining an elevated freeway location within a particular distance from the vehicle. The first, second, third and fourth factors are assessed by the weighting module to generate results used to determine whether or not to inhibit the engaging of the autonomous operating mode feature. The method, further includes: controlling the weighting module and to switch a mode of operation of the autonomous operating mode feature of the vehicle based on results from an evaluation of the GPS data and an estimation error data of the vehicle. The method, further includes: taking an action by the evaluating module to switch the autonomous operating mode based on a condition related to the limited access freeway or a local roadway.

Lastly, in an embodiment an elevated freeway detection apparatus of a vehicle for use when operating the vehicle in an autonomous mode is provided. The elevated freeway detection apparatus includes: a processor module, configured to receive image data, map data, GPS data, and radar data to: process the image data, map data, GPS data and radar data to: determine at least a current vehicle location; determine whether pedestrians are in a vicinity of the vehicle; and evaluate by the determinations whether the vehicle is mapped on a limited access roadway by computing a matching probability of a distance of the vehicle to the limited access roadway based on a set of comparison operations of the map data, the GPS data, and the radar data of the vehicle to the current vehicle location.

In various embodiments, the apparatus further includes: the processor module configured to: send a signal to inhibit the autonomous mode from engaging in the vehicle when the vehicle is not within a determined distance to the limited access roadway wherein the signal is generated subsequently after an evaluation by the processor module; and switch a mode of the vehicle to inhibit the engaging of the autonomous mode wherein the switching of the mode is performed in accordance when a threshold of a map matching probability is exceeded and a position estimation error of the map data, radar data and GPS data is accounted for in the distance of the vehicle to the limited access roadway. The apparatus further includes: the processor module configured to: sum each of a weighted data of the image, radar, map and GPS data to compare results of the summed weighted data to a threshold to determine whether or not the vehicle is on the limited access freeway for operation in the autonomous mode.

It is noted that in various embodiments, the method contains steps which correspond to the functions of one or more of the various embodiments of the surface condition detection system and apparatus described above.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
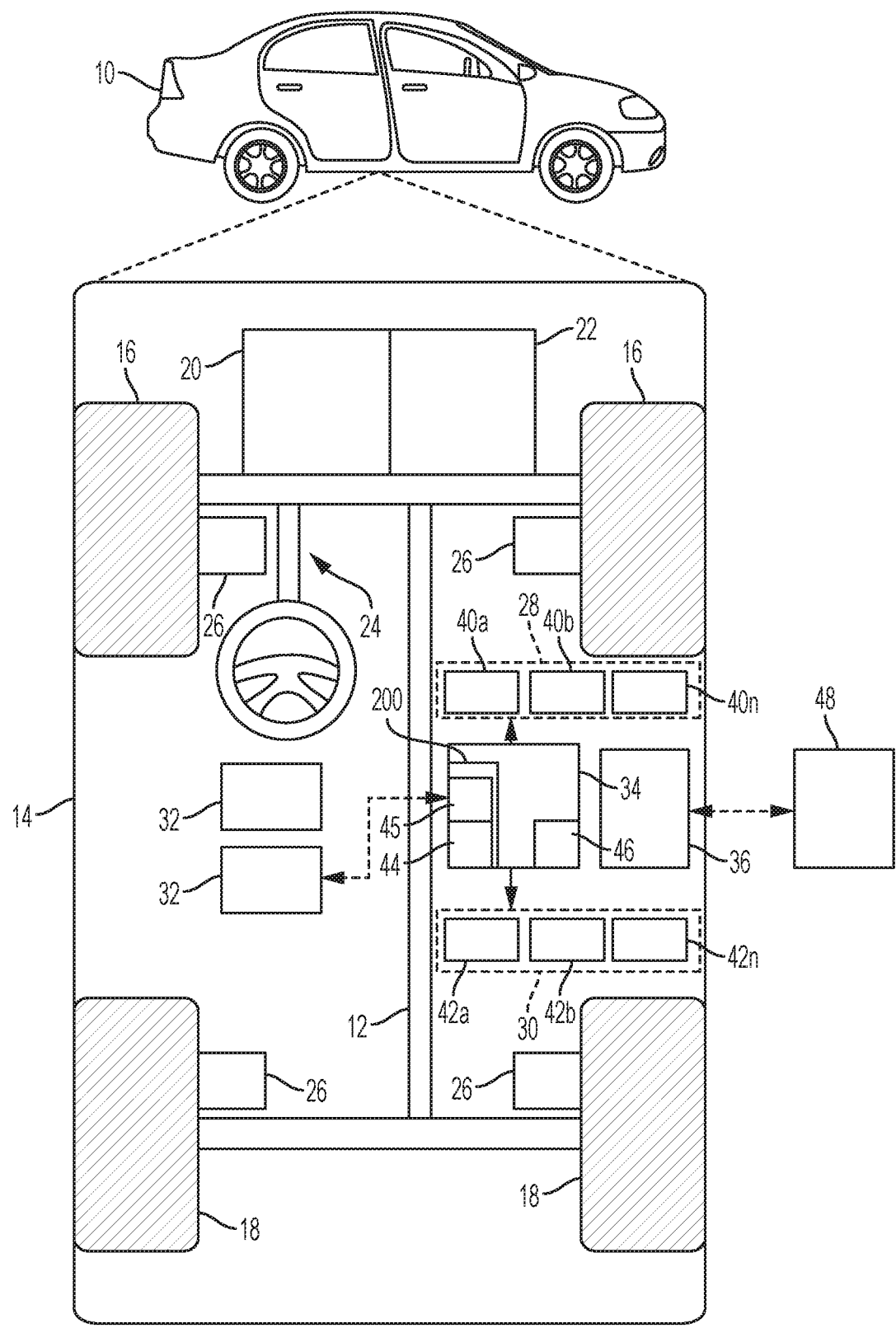
FIG. 1 is an exemplary functional block diagram illustrating a vehicle having an elevated freeway detection system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The term "autonomous" means that the vehicle is performing the movement without intervention of a human, or semi-automatic, i.e., with some human interactions during the movement of the vehicle.

While the description in parts is directed to autonomous or semi-autonomous vehicles, it is contemplated that the functionalities described may be similarly applicable to non-autonomous vehicles and for even additional non-vehicle applications.

Further, references to "limited access freeway" should not be construed as limiting, and may be similarly applicable to any highway, private road, toll road, autobahn with controlled accesses. In addition, references to "elevated highway" are applicable to any major road or limited access freeway that is raised above the ground level.

The reference to GPS should not be construed as limiting to GPS navigation system but can include any Global Navigation Satellite Systems (GNSS) that enable satellite navigation systems and provide autonomous geo-spatial positioning.

To achieve high level automation, vehicles are often equipped with an increasing number of different types of devices for analyzing the environment around the vehicle, such as, for example, cameras or other imaging devices configured to capture imagery of the environment for surveying or detecting features within the environment, and the like. In practice, the different onboard devices are located at different locations onboard the vehicle and typically operate at different sampling rates or refresh rates, and as a result, capture different types of data and parameters corresponding to different points in time from different viewpoints or perspectives which result in a multitude of anomalies particularly when performing image processing applications.

When vehicles received mapping data from local mapping database, this data may not be sufficiently accurate for use in operating autonomous driving features in a vehicle. There is a need to further calibrate this mapping data particularly when enabling autonomous driving features in limited access freeways and not allowing such autonomous driving features on local roadways.

Various embodiments of the present disclosure provide systems and method that enable location and road condition detection in automotive sensing hardware when limitations in processing capabilities must be accounted for in order to still maintain a robust and practical solution. For example, the availability of automotive grade hardware accelerators for hardware sensors may be limited and hence hardware accelerators which may be used in automotive sensors may be derived from the consumer marketplace. The disclosed systems and methods may allow for the necessary level of analysis for road condition detections to be achieved with consumer grade or less expensive sensing hardware.

Various embodiments of the present disclosure provide systems and method that enable road surface condition detection incorporating elevated freeway analysis in sufficiently practical approaches for use with consumer vehicles that use or require a certain or appropriate level of processor capability that is within the range of processor in use in the consumer automotive market. That is, the algorithms to support the elevated freeway analysis may not require an inordinate amount of computation not generally found in vehicles but should recognize the environmental limitations imposed by processing capacities of vehicular processor systems, including for example constraints in power consumption, processing speeds, etc. and provide a lightweight and efficient computation solution.

Various embodiments of the present disclosure provide systems and method that enable elevated freeway detection and ambient light analysis that are more robust than customary approaches used and further do not require unduly expensive hardware when compared with other sensing or detecting approaches. In addition, such systems may share vehicle set-up applications already in use by other standard feature applications in the vehicle. For example, this shared use will allow incorporation of the enhanced detection application in legacy systems of vehicles not incorporating, in-efficiently incorporating, or incorporating to a limited extent detection analysis.

Various embodiments of the present disclosure provide systems and method that enable elevated freeway detection as part of a methodology or framework to enable by the algorithmic solutions disclosed the detection of other road conditions.

Various embodiments of the present disclosure provide systems and method that enable elevated freeway detections to provide enhanced automated or assisted user controls when driving to improve vehicular operations. That is, systems and methods may be provided to enhance the robustness and performance of active safety, driver assistance control systems, and the overall vehicle stability by the more precise operation of autonomous and semi-autonomous route planning features through the enhanced detecting of elevated freeways on particular vehicle paths and appropriate control settings on these paths.

FIG. 1 is a functional block diagram illustrating a vehicle having an elevated freeway detection system, in accordance with various embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the elevated freeway detection system 200 is incorporated into the vehicle 10 (hereinafter referred to as the autonomous vehicle 10). The present description concentrates on an exemplary application in autonomous vehicle applications. It should be understood, however, that the elevated freeway detection system 200 incorporating elevated freeway analysis described herein is envisaged to be used in conventional and semi-autonomous automotive vehicles including driver assist systems, as an example, that make use of lane perception information, such as lane departure warning systems and lane-keeping assistance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. In embodiments, the sensing devices 40a-40n include one or more cameras for obtaining images at a particular frame rate. The one or more cameras are mounted on the vehicle 10 and are arranged for capturing images of an exterior environment of the vehicle 10 (e.g. a sequence of images in the form of a video).

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes a redundant computer architecture of at least a processor 44 and a processor 45, were the processor 44 may be considered a primary processor and the processor 45 may be considered a backup processor. The processor 44 and the processor 45 are coupled to at least one computer readable storage device or media 46. The processor 44 and the processor 45 can be any custom made or commercially available processor, a central processing unit (CPU), a graphics processing unit (HW accelerator), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while both processors 44, 45 are powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processors 44 and the processor 45, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 4:
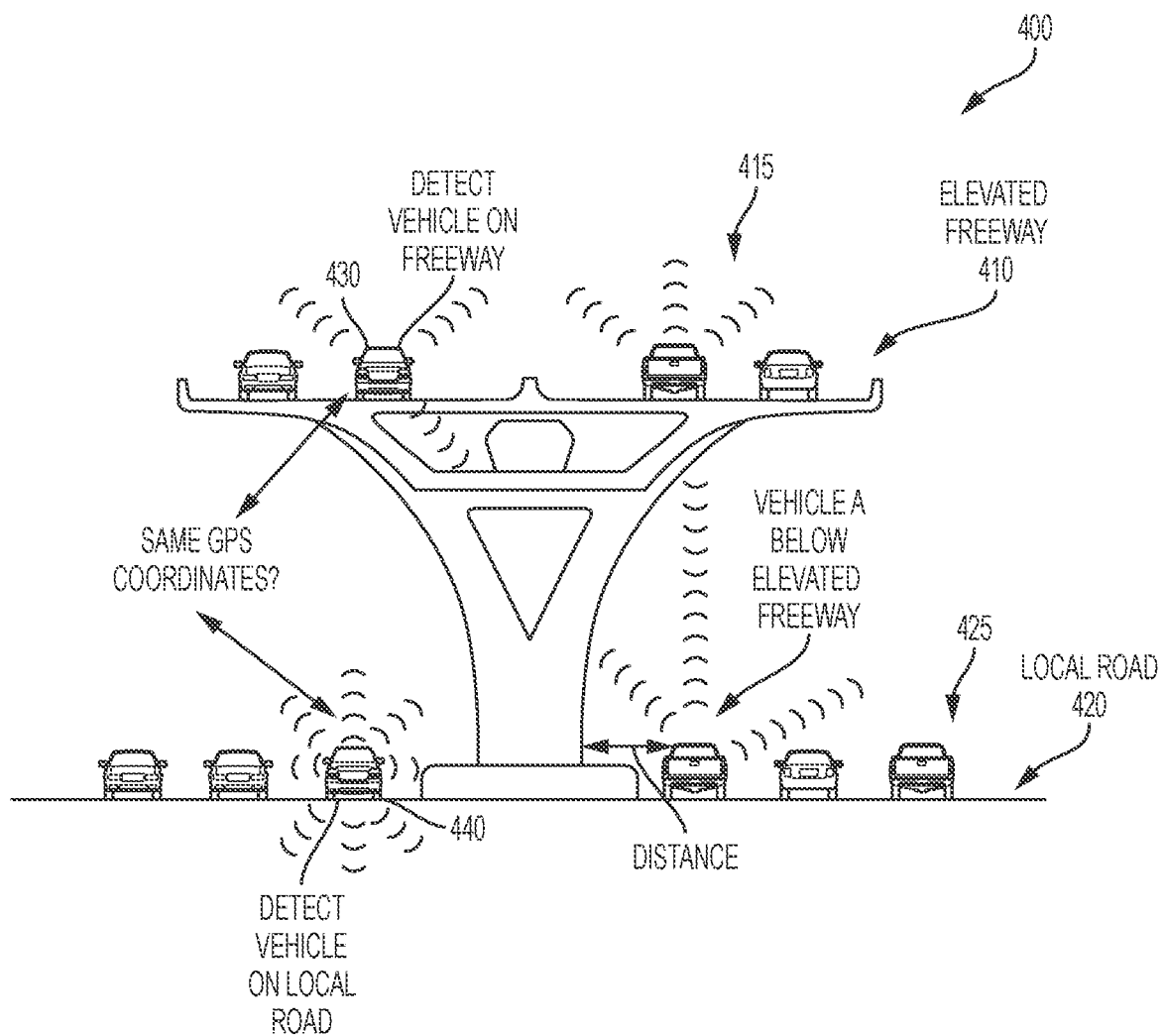
FIG. 4 is an exemplary diagram illustrating vehicles near an elevated freeway with the elevated freeway detection system, in accordance with various embodiments.

In various embodiments, and with reference to FIG. 4, one or more instructions of the controller 34 are embodied in the elevated freeway detection system 200 and, when executed by the processors 44, 45 are configured to receive input data and input parameter data and produce output data and output parameter data for use by an automated feature of the vehicle 10.

Figure 2:
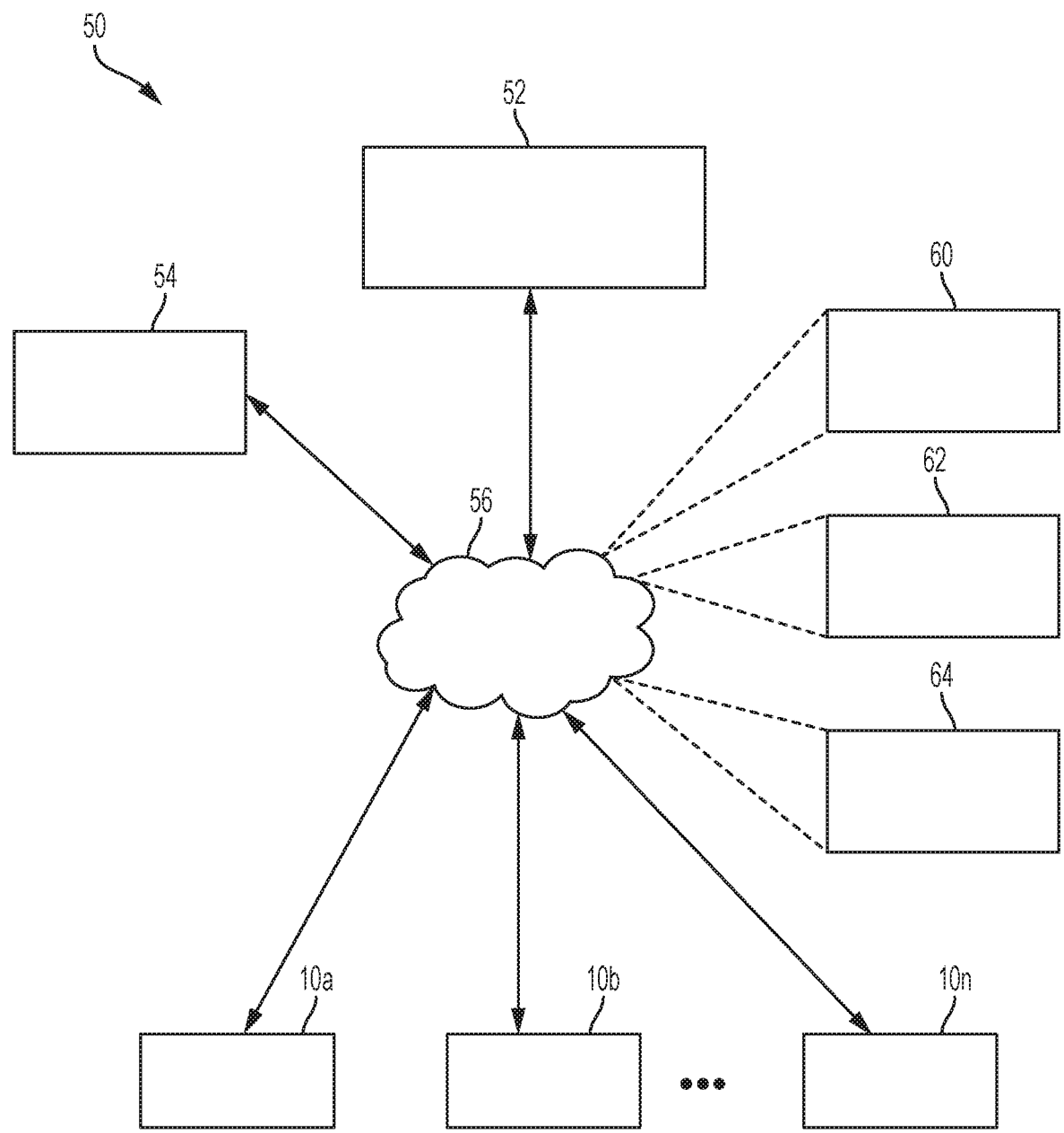
FIG. 2 is an exemplary functional block diagram illustrating a transportation system having one or more autonomous or semi-autonomous vehicles, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

The subject matter described herein concerning the elevated freeway detection system 200 is not just applicable to autonomous driving systems, devices and applications, but also other driving systems having one or more automated features utilizing computer capabilities. Further, the elevated freeway detection system 200 is operable in other systems, devices and applications than the automotive sphere for detecting elevated freeways.

In accordance with an exemplary autonomous driving application, the controller 34 implements an autonomous driving system (ADS). That is, suitable software and/or hardware components of the controller 34 (e.g., the processors 44, 45 and the computer-readable storage device 46) are utilized to provide an autonomous driving system 70 that is used in conjunction with vehicle 10.

Figure 3:
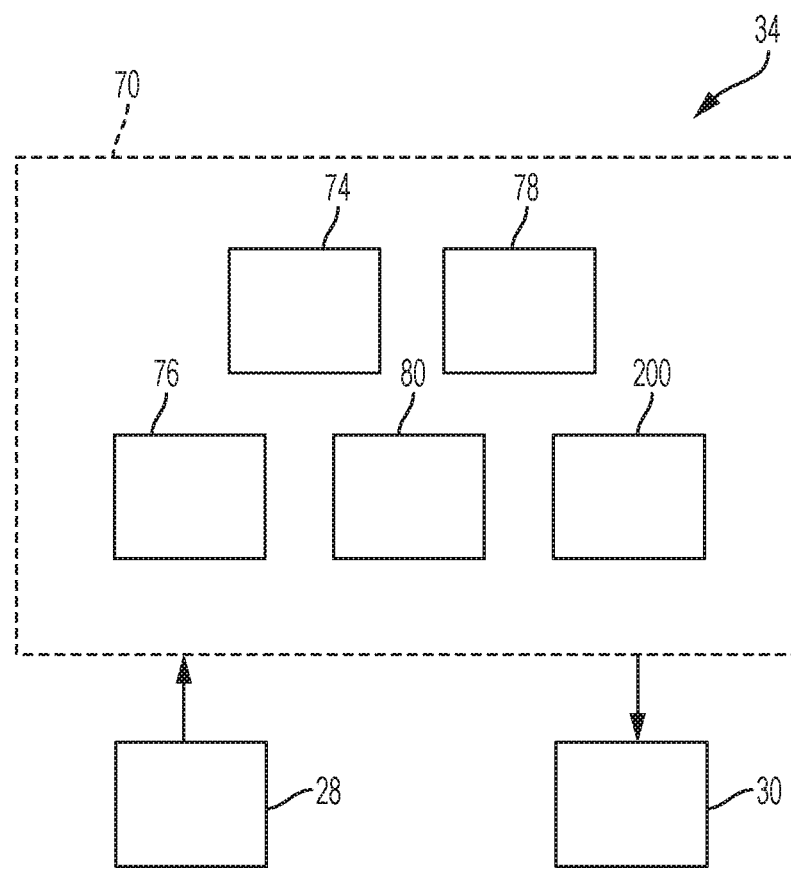
FIG. 3 is an exemplary diagram illustrating an autonomous or semi-autonomous driving system that includes an elevated freeway detection system in an autonomous or semi-autonomous vehicle, in accordance with various embodiments.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various exemplary embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the elevated freeway detection system 200 of FIG. 1 (and FIG. 5) may be included within the ADS 70 in autonomous driving systems and applications, for example, as part of the elevated freeway detection system 200 to enhance vehicle control in various conditions. The elevated freeway detection system 200 is configured to output parameter data for use in various possible automated control modules that rely on feature detection and localization. In some embodiments, the detected image features include parameter data for path planning and vehicle control of road feature parameter data (such as road boundaries and road markings including road side signs and traffic lights); lane feature parameter data (such as lane boundaries and lane markings); and surrounding objects parameter data (including pedestrians, other vehicles, buildings, etc.). Such detected image features parameter data is utilizable by the guidance system 78 to determine upon a trajectory for the vehicle 10. The vehicle control system 80 works with actuator system 30 to traverse such a trajectory.

In various exemplary embodiments, Wi-Fi, WiMAX or Bluetooth connected cameras and smart devices may be used in conjunction by sending additional images to the elevated freeway detection system 200 for use in detecting elevated freeway conditions. For example, a passenger or driver using an app of a smart phone may be able to remotely capture road conditions with GPS tags embedded for sending via IP connectivity's to vehicle processing system for the adding to elevated freeway detection.

In various exemplary embodiments, information from the elevated freeway detection system via the cloud network may be shared with other users, provided to third party databases, aggregated for further analysis, provided to third party mapping and traffic related applications, provided to social network applications, and sent to government traffic maintenance and support agencies. For example, such information could be sent to cloud sharing traffic applications like WAZE®, GOOGLE® MAPS, and INRIX® for use in auto-intelligent, route planning, route reporting, and other applications.

FIG. 4 illustrates a diagram of use in a vehicle of an exemplary elevated freeway detection system 400 in accordance with an embodiment. In FIG. 4 there is disclosed an elevated freeway structure 410 with a limited access freeway and a local roadway 420 below the elevated freeway structure 410. A vehicle 430 on the elevated freeway 410 may have the same or similar GPS coordinates as a vehicle 440 on the local roadway. This may result in an advertent actuation of the automated cruise feature on the vehicle 440 on the local roadway. The elevated freeway detection system detects the distance of the vehicle 440 from the elevated freeway 410. In addition, the elevated freeway system detects pedestrian traffic or other characteristics to determine whether the vehicle is on a local roadway 420 or on the elevated freeway 410.

In exemplary embodiment, the elevated freeway detection system in the vehicles may detect (though not limited) the distance or latitude and longitude components from an elevated freeway 410 to make a determination whether or the vehicle is on the elevated freeway 410. The elevated freeway detection system in the vehicle may further calibrate received local mapping data which may not be accurate or not sufficiently accurate to make a determination of whether the vehicle 430 is on an elevated freeway 430 or a local roadway 420. For example, a vehicle 430 on an elevated freeway 410 would have a different GPS coordinate that would allow the elevated freeway detection the vehicle 425 may also detect characteristics of a local roadway such as pedestrians present by using sensing devices such as optical radar devices of the vehicle to generate data for processing by the elevated freeway detection system for the determination of vehicle location on or not on a local roadway or elevated freeway.

Figure 5:
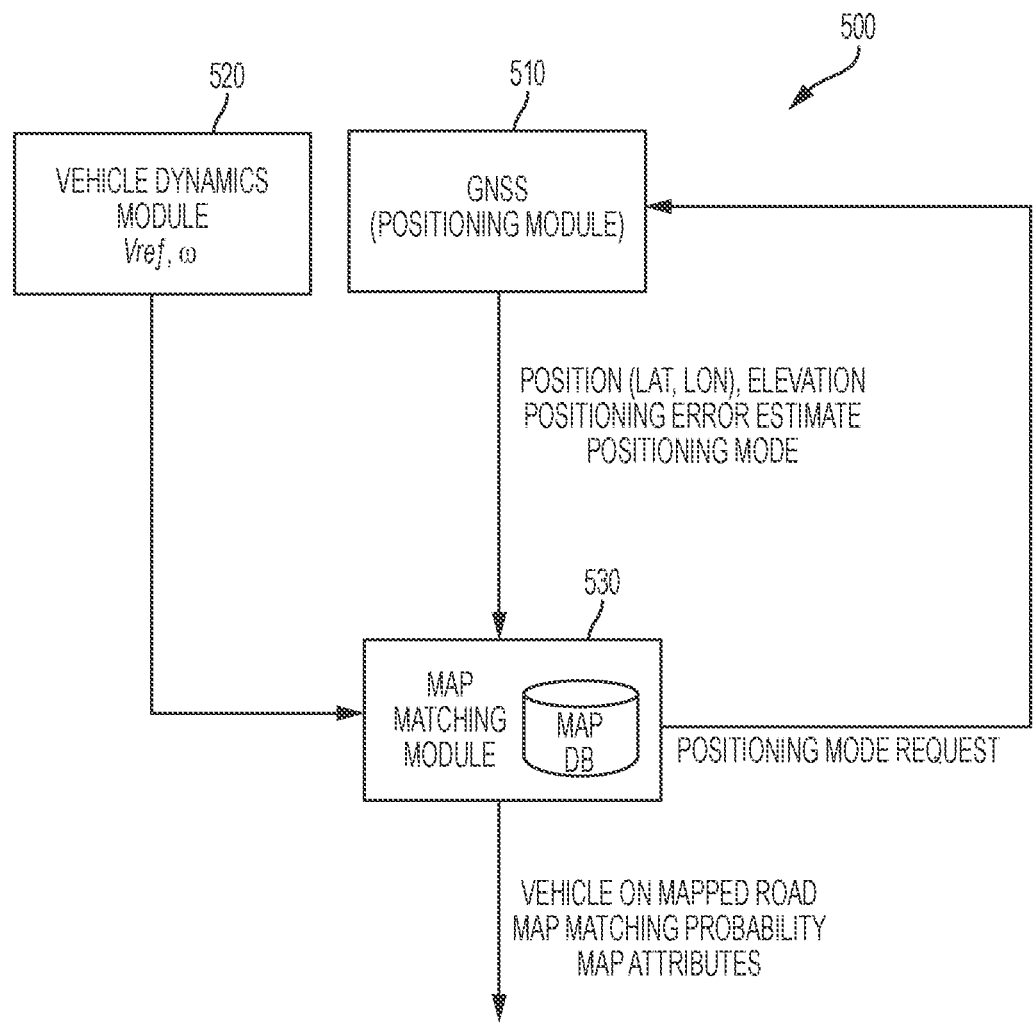
FIG. 5 is an exemplary block diagram illustrating the elevated freeway detection system, in accordance with various embodiments.

FIG. 5 illustrates an exemplary elevated freeway detection system 500 in accordance with various embodiments. The elevated freeway detection system 500 (corresponding to elevated freeway detection system 200 of FIGS. 1-4) includes a vehicle dynamics module 520, a Global Navigation Satellite System (GNSS) positioning module 510 and a map matching module 530 in a vehicle. In this particular configuration, as the vehicle approaches and enters a limited access freeway, the positioning module 510 provides a current vehicle location which may include data such as the latitude and longitude coordinates of the entrance to the limited access freeway, the elevation of the limited access freeway, a positioning error estimation from the limited access freeway to the vehicle position and a notification that the positioning module 510 is in a positioning or measuring mode of the freeway and vehicle positions.

The map matching module 530 receives, as input, data or other information from the positioning module 510 and from the vehicle dynamics module 520, uses the input to determine by various application solutions if the vehicle is currently on a mapped road or a freeway, and computes a map matching probability. The map matching module 530 provides for a more accurate calibration of the vehicle position than the map data received from the mapping database (MAP DB in FIG. 5S). The map data from the MAP DB is not always accurate or may not be sufficiently accurate in certain instances. For example, the accuracy of the mapping data from the MAP DB is reduced when the vehicle is driven in a tunnel or under an elevated freeway or close in distance to a limited access freeway. That is, the needed level of a precise mapping location of the vehicle is not always possible when certain obstacles to increase the accuracy of the vehicle position determination a further calibration of map data received to a vehicle position is necessary by various map matching solutions in order to determine whether to actuate an autonomous feature allowing for at least a limited (i.e. level 2) autonomous driving application. This map matching is based on a variable matching probability level that can be calibrated at different threshold to avoid false determinations or false matches of the position of the vehicle. That is, the probability may be based on historic statistical information, averages of this historic information or derived momentarily using the inputted data.

After receiving mapping data from the MAP DB (In FIG. 5), the map matching module 530 may, for example, determine that the probability corresponds or matches to a result of a local road probability level; if this is the case, then an affirmative result is generated by the map matching module 530 and a position mode request signal is sent to the positioning module 510 to switch the mode of the elevated freeway detection system 500 by a "RTX Correction Mode" (re-transmit the correction mode) signal to change the mode and to not remain in the automated cruise mode used when on the freeway. That is, a determination is made that the vehicle is likely under or near an elevated freeway but on a local road by the further calibration of the map data by the matching algorithms of the matching module. Alternatively, if there is no affirmative result, the cycle reverts back to the initial step to continue monitoring to determine when the vehicle leaves the limited access roadway.

The map matching module 530 may detect that the current road is a stacked freeway based on various mapping attributes received; is this case, the map matching module 530 may use a region of interest (ROI) algorithm, along with other conditions, to determine if the vehicle is on the freeway. The map matching module 530 can use various information and application solution such as the time duration from an initial positioning mode request to the time of an actual position mode switch occurring as well as a map matching probability formulated with a position error estimate. In instances, when the map matching module 530 determines that the vehicle is on the freeway, the map matching module 530 may then send out map attributes and a matching probability for various other features for receiving, and that are connected to the elevated freeway detection system 500 of the vehicle. Alternately, the flow process may revert back to the initial step of monitoring by the positioning module 510.

TABLE 1.0

Cruise Enabling Criteria

1 Map Matched to Elevated Freeway
2 Map Matching Stable Maturity > Cal (~15 s)
3 Request to actual Position Mode Switch (PPS) in RTX Mode Duration Maturity > Cal (~5 s)

The information for calibration of the mapping data by the detection and the various enabling criteria for the elevated freeway detection system 500 for activating of the mode to an autonomous driving mode may be expressed in Table 1.0. First, the vehicle may be configured in a number of autonomous driving modes. For example, this may include a more limited level of autonomous driving function (i.e. a cruise mode) or a less limited of higher level (i.e. a super cruise mode or level 2 autonomous driving level). In the more limited or lower autonomous driving mode, the cruise mode (also applicable to the super cruise mode), Table 1.0 shows the conditions that allow operation in this more limited autonomous mode as well as in the less limited autonomous mode. As explained in Table 1.0, the mapping data from the MAP DB remains stable by the ongoing map matching by the map matching module 530 for a period of time; in this instance, through empirical testing a period calculated at about 15 seconds is needed and the request for the mode to be switched is performed on an ongoing basis during the vehicle operation where the requests are calculated in 5 second intervals.

That is, once the map matching is stable for about 15 seconds for detection that the vehicle is on an elevated freeway or on a local roadway, then the mode is switched or kept in a more limited or less limited autonomous mode after the initial 15 seconds which is re-checked every 5 seconds to ensure that the enhanced calibration of the mapping data from the mapping DB is performed on an ongoing basis. Hence, the criteria is re-checked (in approximately 5 second intervals) again to determine whether there has been a change such as the vehicle exiting from the freeway to a local roadway or the vehicle entering the freeway from the local roadway. If the vehicle is traveling at a much higher speed, the time interval for re-checking may be reduced to ensure the accuracy of the mapping data and the vehicle location which is changing more rapidly.

TABLE 2.0

| Cruise Inhibit Criteria Under Elevated Freeway | Under Freeway | On Freeway |
|---|---|---|
| 1 Time PPS_RTX Request to RTX Mode Engaged > Cal (~5 s) | ~30 s, up to 100 s | <~2 s |
| 2 PPS_2DAbsErrEst > ~1 m for Cal (~3 s) in RTX Mode | ~1.2 m | <0.8 m |
| 3 Map Matching Probability < Cal (~50%) for Cal (~5 s) | low, esp. for outer lanes | ~80% |

The information for detection and the various enabling criteria for the elevated freeway detection system 500 for the automated cruise mode enabled or engaged or disabled or not engaged may be expressed in Table 2.0 for detections on the freeway and for detections below the elevated freeway. Table 2.0 describes the detection and determination criteria when receiving map data from the mapping database MAP DB (In FIG. 5) and further calibration of the map data to determine the vehicle location and whether or not to engage or not engage the limited autonomous driving feature, in this case as an example the level 2 more autonomous feature (i.e. the super cruise feature though applicability to the cruise feature is also feasible). Here, when the vehicle is under the freeway, a time period of greater than 5 seconds is calculated prior to executing the signal for re-transmit engagement of the limited autonomous mode. That is, the period can be expressed $Time_{PPS\_RTX\ Request\ to\ RTX\ Mode\ Engaged} > Cal\ (\sim 5\ s)$ to engage the autonomous feature. When the vehicle is under the freeway as determined by the mapping data, the interval is calculated at greater than 30 seconds and up to 100 seconds before engaging the autonomous feature. That is the interval can be expressed as >~30 s and up to 100 s. When the vehicle is on the freeway the period is <~2 s for each determination of whether to disengage the limited autonomous feature. During both instances, when on and off the freeway, there is a calibration error from the received mapping data position from the mapping database of MAP DB (of. FIG. 5). The position estimate error for a position mode to switch is PPS_2DAbsErrEst>~1 m for Cal (~3 s) in RTX Mode and is for a distance of >~1.2 m when under the freeway and <~0.8 m when on the freeway. The map matching criteria is a map matching probability <Cal (~50%) for Cal (~5 s) is low (especially for the outer lanes) for detecting the vehicle under the freeway and >~80% for detecting the vehicle below the elevated freeway.

Figure 6:
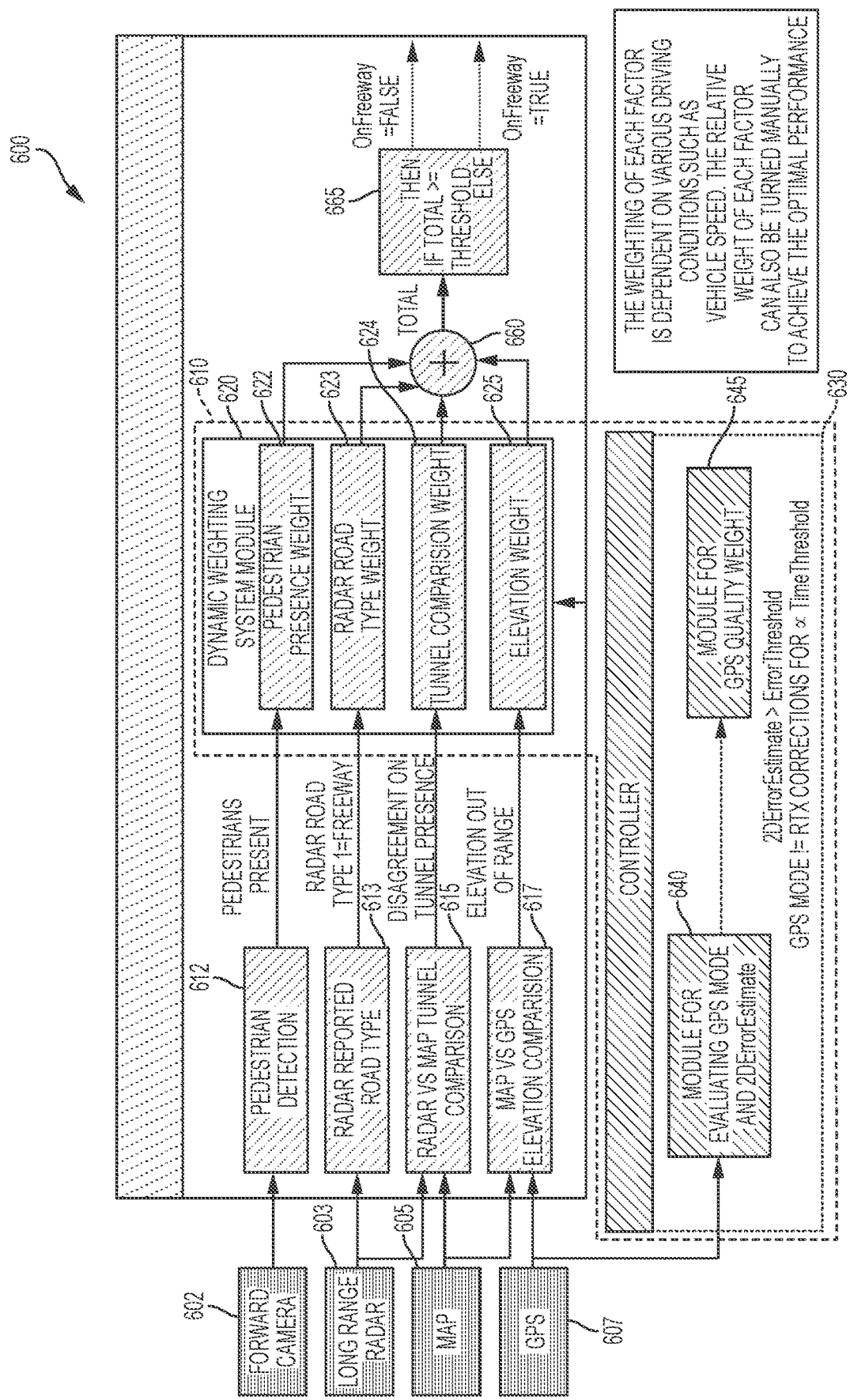
FIG. 6 is an exemplary block diagram illustrating the elevated freeway detection system, in accordance with various embodiments

FIG. 6 illustrates another exemplary elevated freeway detection system 600 in accordance with various embodiments. In FIG. 6 there is disclosed a system for assessing multiple criteria prior to assessing current road condition as well local roadways being navigated by the vehicle that are partially covered or not in relation to the GPS performance key characteristic of driving under elevated freeway is partial sky coverage which impacts GPS performance. The objective is to eliminate false positives under elevated freeway, while minimizing impact of false negatives on an elevated freeway. The elevated freeway detection system 600 identifies when the vehicle is under the elevated freeway and inhibits the feature activation, or vice versa (i.e. activates the feature activation when an elevated freeway is not detected). The elevated freeway detection system 600 via multiple inputs of data of GPS 607 data, mapping data 605, long range radar 603 and forward cameras 602 provide real time identification of whether vehicle is on or under elevated freeway enables by utilizing this multiple data (and subsequent multiple criteria) to make determinations based on the multiple criteria prior to allow a super cruise or cruise feature (i.e. an enhanced automated driving feature) of the automated system on an elevated freeway and to inhibit super cruise under elevated freeway for safety. This allows for a reliable on-freeway performance and robust feature inhibition on local streets to resolve local street above freeway scenario.

Further in FIG. 6, the inputs of the surrounding data are connected as follows: the forward camera 602 is coupled to a pedestrian detection module 612; the long range radar 603 is coupled to a radar reported road type module 613 and to a radar versus map tunnel comparison module 615; the radar versus map tunnel comparison module 615 also receives input about mapping data 605; and finally, the map versus elevation comparison module 617 receives input of the mapping data 605 and the GPS 607 data.

The pedestrian detection module 612 is configured to detect the presence of pedestrians in the vicinity of the vehicle. If pedestrians are detected, then there may be a presumption that the vehicle is on a local road because pedestrian access to freeways may not be permitted. The radar reported road type module 613 is configured to determine by the radar what the road type is, for example the road type may be detected as a freeway. The radar versus map tunnel comparison module 615 is configured to compare the local mapping data of the tunnel to more precise positional data received by the long range radar 603 and make determination of the position of the vehicle. The map versus elevation comparison module 617 is configured to compare the GPS sensed data from GPS 607 with the mapping data from map 605 and make elevation comparisons to determine whether the vehicle is on an elevated freeway.

The elevated freeway detection system 600 further includes a dynamic weighting module 620 and a controller 630. The results of these various comparisons are forwarded to the dynamic weighting module 620 which applies a particular weighting factor to each of the inputs received from the various comparison and detection operations. The dynamic weighting module 620 allows for objective weighting of the sensed data and the map data to make the eventual determination of whether the vehicle is on or not on the elevated freeway or in the tunnel.

The dynamic weighting module 620 is controlled by the controller module 630, which receives, as input, GPS 607 data for evaluating, by an evaluation module 640, the mode of operation and to determine the estimation error (i.e. position estimation error) from an elevated freeway structure or local road. The controller module 630 includes an evaluation module 640 and a module for GPS quality weights 645. The evaluation module 640 is configured to evaluate the data from GPS with a two dimensional error estimation. The module for GPS quality weights 645 is configured to apply weighting factors for various driving conditions to control the dynamic weighting system module 610. The controller module 630 also makes determinations on the evaluation results from the evaluation module 640 by applying a set of GPS quality weights via the module for GPS quality weights 645. The controller module 630 modulates the dynamic weighting module 620 and make the appropriate adjustments to the weighting factors which include the pedestrian presence weight 622, the radar road type weight 623, the tunnel comparison weight 624 and the elevation weight 625. The outputs for the dynamic weighting module 620 are summed in accordance with the weighting accorded each of the outputs at 660.

The output is sent to the threshold module 665 for making determinations of the totals compared to various threshold and applies a two part test to the result; that is, if the total is greater than a given threshold then the result is non-affirmative of false then the vehicle is not on the freeway, or else, if the result is an affirmation of true then the vehicle is on freeway. In various embodiments, the weighting of each factor is dependent on various driving conditions such as the vehicle speed and the relative weight of each factor can be tuned manually to achieve the optimal performance.

Figure 7:
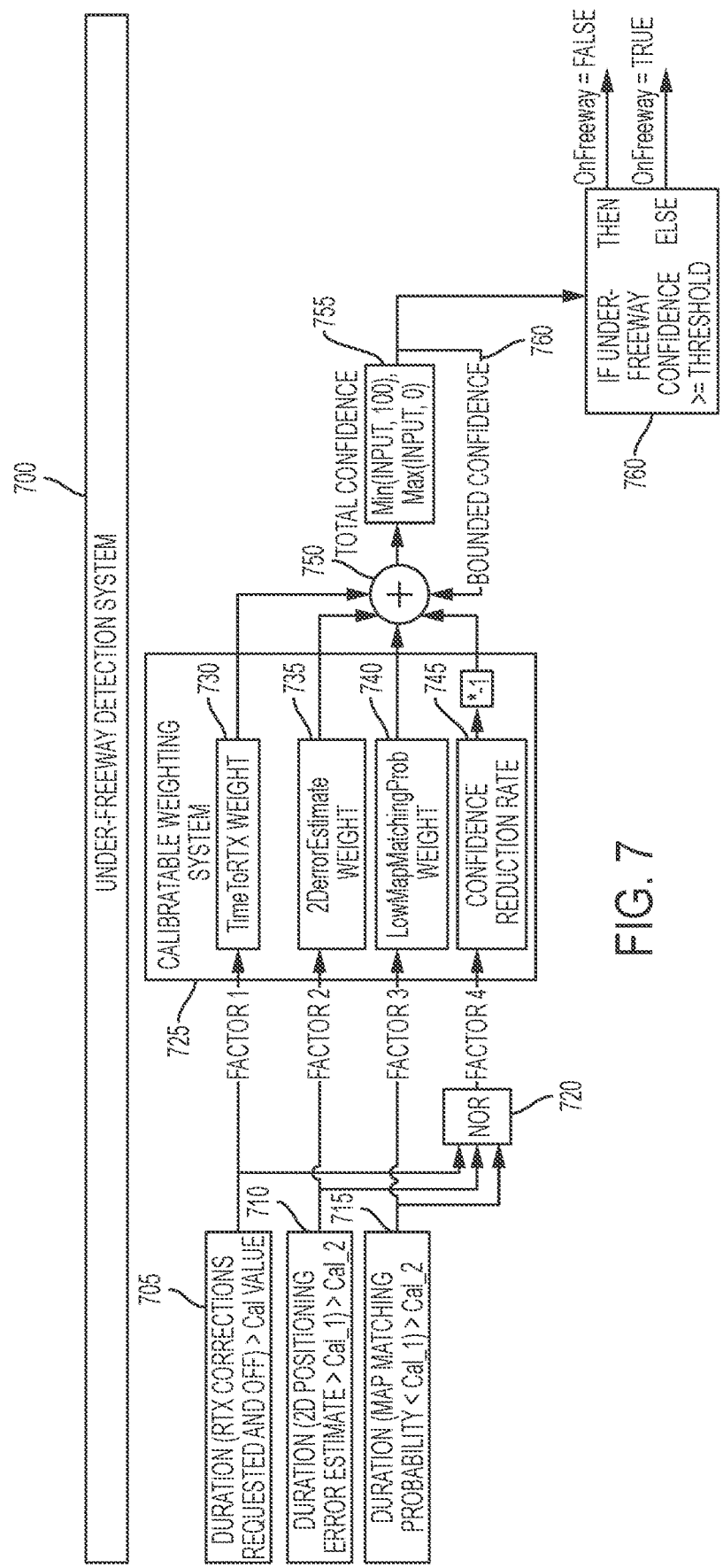
FIG. 7 is an exemplary block diagram illustrating an under the freeway detection of the elevated freeway detection system, in accordance with various embodiments.

FIG. 7 illustrates an exemplary under the freeway detection system 700 in accordance with various embodiments. In FIG. 7 the under the freeway detection confidence system illustrates the confidence level determination steps. Initially, the confidence receives inputs of four factors of a particular duration. The evaluation module 705 evaluates for a duration of the retransmit correction request signal in an ON and OFF state for a period greater than a calculated value for the determining of the factor 1. The evaluation module 710 evaluates for a duration a two dimensional positioning error estimate for greater than a first calculated value and greater than a second calculated value. The evaluation module 715 evaluates for a duration a mapping probability less than a first calculated value and greater than a second calculated value. The output of the evaluation module 705, evaluation module 710 and evaluation module 715 is logically combined by a NOR module 720 to output the fourth factor. The calibrating weighting module 725 calibrates by a weighting module 730 the time to retransmit a weight, by a weighting module 735 the two dimensional error estimation weighting, by a weighting module 740 the low map matching probability weighting and by a weighting module 745 a confidence reduction rate multiplied by negative one factor. The output from each of the weighting modules 730, 735, 740 and 745 is summed at 750 for outputting a total confidence at 755 of a minimum value (of input, 100) and a maximum value (of input, 0). The output of the total confidence is feedback 760 for summing at 75 with the other outputs. The logic used in the under freeway detection process can be described with each of the factors functionally shown as follows:

For Factor_1=Duration((RTX_CorrectionsRequested==TRUE) AND (RTX_Corrections==OFF))>Cal_value.

For Factor_2=Duration((min(2DErrorEstimate, MaxError)−MinError)/(MaxError−MinError)>Cal_1)>Cal_2.

For Factor_3=Duration(MapMatchingProbability<MinProbability)>Cal_value; and Factor_4=NOT(OR(Factor_1>0, Factor_2>0, Factor_3>0)).

The calibrations can be determined as follows: The minimum error or MinError is the largest amount of error which is still acceptable; The maximum error or MaxError is the largest possible/expected error; The minimum probability or MinProbability is related to the map matching MapMatching probability, below which is unacceptably low. The upper threshold is equal to: UpperThreshold—if boundedConfidence is above this value, transitions OnFreeway=TRUE->FALSE. The lower threshold is equal to: LowerThreshold—if boundedConfidence is below this value transitions OnFreeway=FALSE->TRUE.

The weights of the weighting modules are calculated as follows: for weights 0<Weight_i<100 and for Weight_i may be calibrated to place a higher value on any given factor. This higher value allows for filtering of the inputs to enable a tuning of the calibration module 725 with a faster response time as well as fewer false positives. The confidences can be expressed as follows:

BoundedConfidence=Max(Min(TotalConfidence, 100),0) and TotalConfidence=Bounded-Confidence'+sum(factor_i*weight_i).

Figure 8:
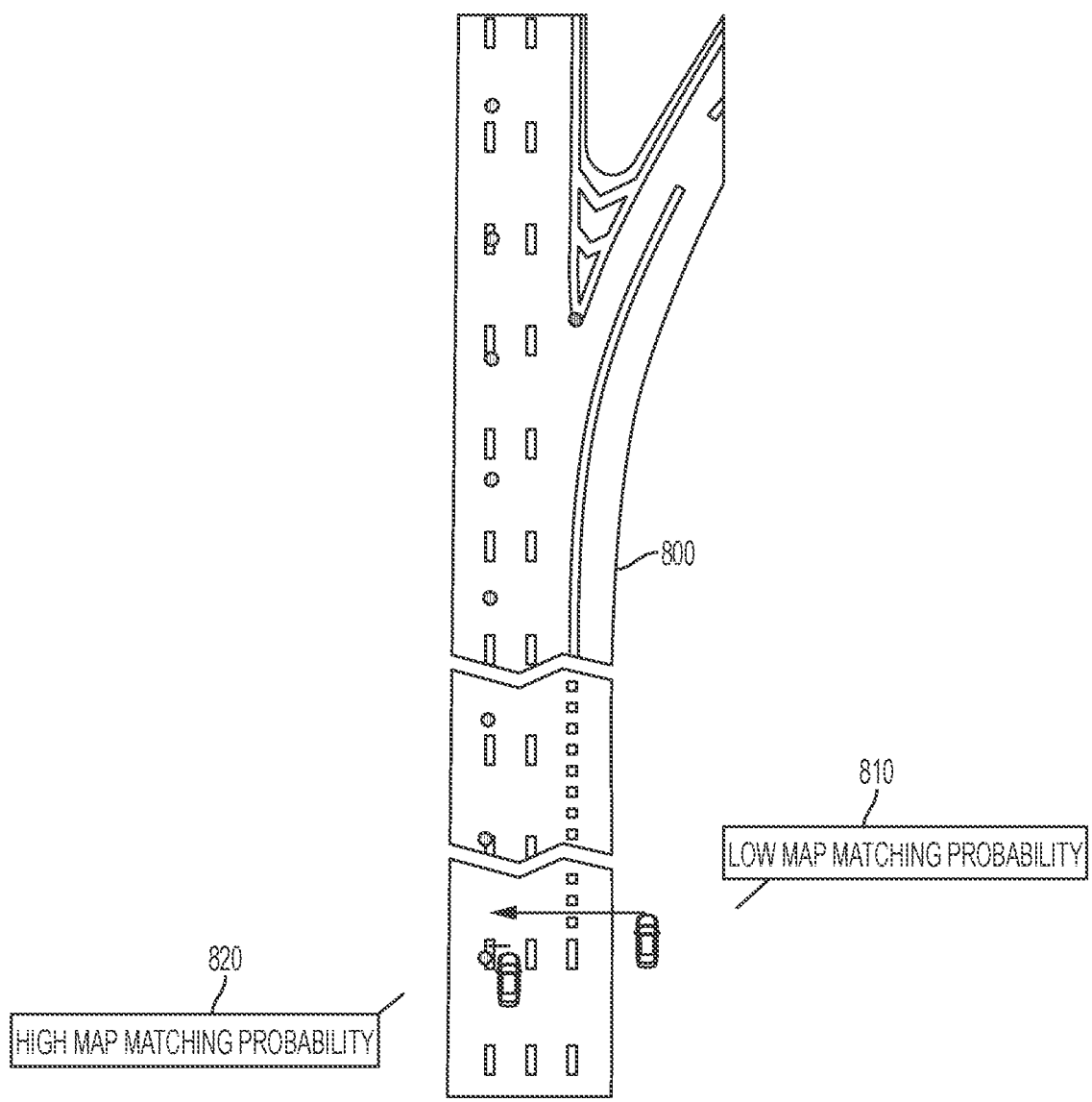
FIG. 8 is an exemplary diagram illustrating matching probabilities of a vehicle of the elevated freeway detection system, in accordance with various embodiments.

FIG. 8 illustrates a vehicle next to a limited access freeway 800 with a high map matching probability 820 and a low map matching probability 810 of the local mapping data from a local map database of the vehicle to sensed data from the vehicle sensors of the vehicle location. When the vehicle is next to or close to the limited access freeway 800 the reliability or accuracy of the map data is low and the map matching probability 810 with the sensed data is therefore low. When the vehicle is on the limited access freeway 800, the sensed data of the vehicle and the local map data of the location of the vehicle are closely aligned and therefore the map matching probability is high of the high matching probability 820.

Figure 9:
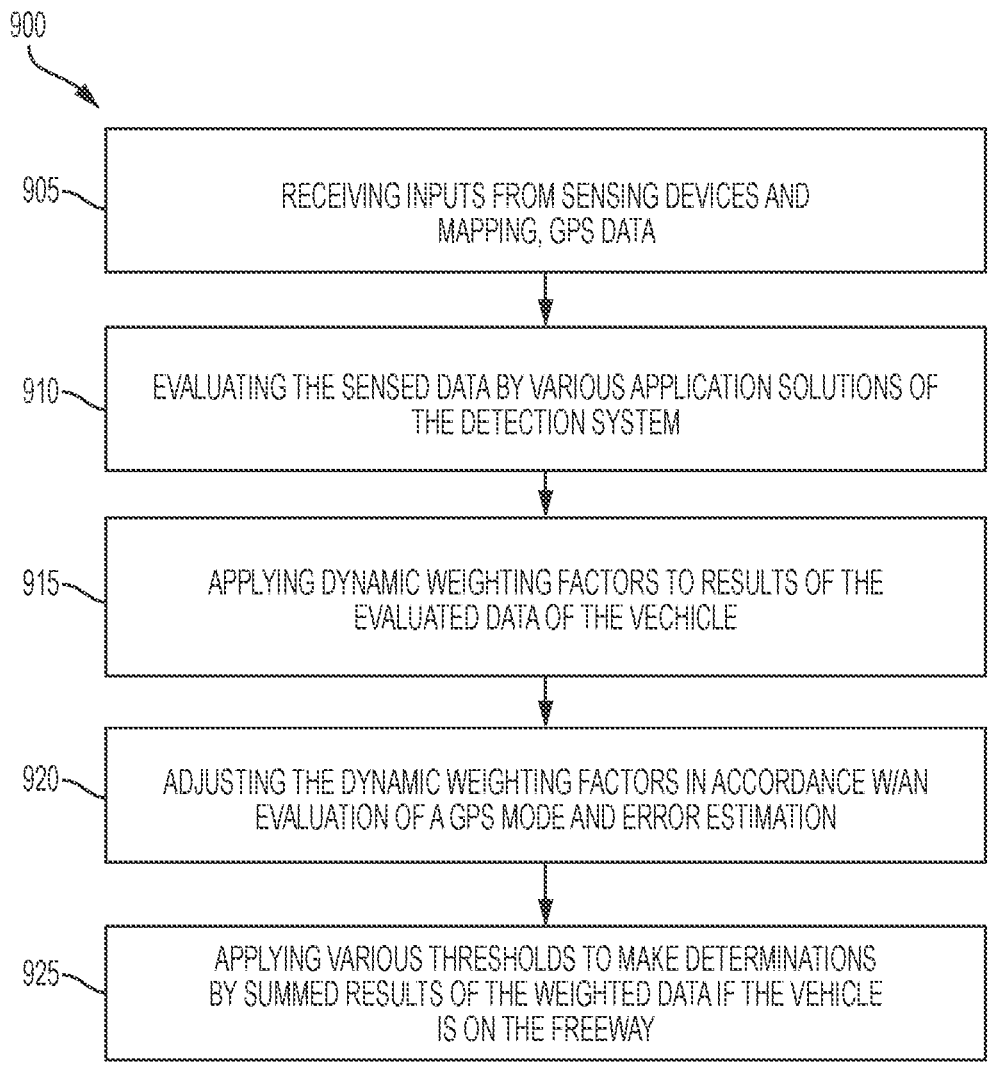
FIG. 9 is an exemplary flowchart illustrating the elevated freeway detection system, in accordance with various embodiments.

FIG. 9 is a flow diagram of the elevated freeway detection system in accordance with an embodiment. At step 905, the elevated free detection system receives inputs from various sensors as well as mapping and GPS data. The sensing data may be received in real-time and may also include vehicle dynamics and historic data which may be used to augment the data set of the sensed data. In various exemplary embodiment, the received data may be received via connected cloud device, mobile devices and may allow for more accurate determinations of the vehicle position or predicted position. At step 910, the sensor data together with the mapping and GPS data are evaluated with appropriate algorithmic solutions to make determinations of the vehicle surroundings. For example, block detection applications may be used to determine the presence of pedestrians. Additionally, evaluation of the radar data and comparisons of the radar and mapping data can lead to determinations of the road surface, road elevations, and presence of tunnels. At step 915, various weighting factors are applied to the results of the sense data in order to prioritize the sensed data in making determinations of the vehicle location on or off a limited access roadway. At step 920, adjustments and control of the weighting factor operations are adjusted in accordance with evaluations of the mode of operation and estimated error from an elevated freeway structure. Also, the GPS quality is evaluated and weighted for adjusting the other weighting. At step 925, the results are summed and compared to thresholds or ranges to determine if the vehicle is on the limited access road or not.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An elevated freeway detection system for controlling actuation of an autonomous operating mode feature of a vehicle to operate when the vehicle is on a limited access freeway, the elevated freeway detection system comprising:
   a plurality of sensors of the vehicle that generate a plurality of sensed data about the vehicle, wherein the plurality of data at least comprises: map data from a local map database of a mapped location, and sensed position data of a global positioning system (GPS) data and of a radar of data of the vehicle;
   a detection module for detecting a map match based on a time interval comprising a first duration to detect when the vehicle is on the limited access freeway or on a local roadway, and a second duration to recheck for a change in map match to detect when the vehicle is exiting from the limited access freeway to a local roadway, or the vehicle is entering the limited access freeway from the local roadway wherein when the vehicle is traveling at a greater speed, the time interval to recheck is reduced to ensure accuracy of the map match with the sensed position data;
   an evaluation coupled to the plurality of sensors to receive the sensed data to compare the mapped location to the sensed position data by a set of comparisons of the map data to the radar and the map data to the GPS data to determine a set of factors wherein each factor of the set of factors is dynamically weighted to compute a matching probability between the mapped location and the sensed position data wherein the matching probability comprises: a sum of each dynamically weighted factor; and
   a summing module to sum each dynamically weighted factor to generate a summed result for comparison to a threshold wherein when the summed result exceeds the threshold then the evaluation module generates a signal to inhibit an autonomous operating mode feature in the vehicle from engaging as the vehicle when the summed result exceeds the threshold, the vehicle is deemed not to be operating on the limited access freeway.

2. The elevated freeway detection system of claim 1, further comprising:
   receiving, by the evaluation module, image data from a camera of the vehicle for capturing images surrounding the vehicle.

3. The elevated freeway detection system of claim 2, further comprising:
   detecting, by the evaluation module, image data of a pedestrian by the camera of the vehicle when performing a pedestrian detection operation to determine whether the vehicle is on the local roadway when pedestrian traffic is detected.

4. The elevated freeway detection system of claim 3, further comprising:
   determining, by the evaluation module from radar data, a road type by receiving radar data from a long range radar directed to the road surface for capturing radar data of the road surface.

5. The elevated freeway detection system of claim 4, further comprising:
   a weighting module processing the dynamically weighted factors wherein the dynamically weighted factors comprise:
      a first factor of a pedestrian detection from the image data;
      a second factor of a road type determination from radar data for determining the road type is the limited access freeway;
      a third factor of a comparison of the radar data and the map data for determining a tunnel within a vicinity of the vehicle; and
      a fourth factor of a comparison of the map data and GPS data for determining an elevated freeway location with a particular distance from the vehicle.

6. The elevated freeway detection system of claim 5 wherein the first, second, third and fourth factors are assessed by the weighting module to generate results used to determine whether or not to inhibit the engaging of the autonomous operating mode feature.

7. The elevated freeway detection system of claim 6, further comprising:
   a controller for controlling the weighting module and to switch a mode of operation of the autonomous operating mode feature of the vehicle based on results from an evaluation of the GPS data and an estimation error data of the vehicle.

8. The elevated freeway detection system of claim 1 wherein when the summed result does not exceed the threshold then the evaluation module generates a signal to enable an autonomous operating mode feature of the vehicle to engage in the vehicle when the summed result does not exceed the threshold, the vehicle is deemed to be operating on the limited access freeway.

9. A method to detect an elevated freeway for controlling actuation of an autonomous operating mode feature of a vehicle for operating when the vehicle is on a limited access freeway, the method comprising the steps of:
   receiving, by an evaluation module disposed within the vehicle, a plurality of data about the vehicle at least comprising: map data from a local map database of a mapped location, and sensed position data from a global positioning system (GPS) data and from a radar of data of the vehicle of a sensed vehicle location;
   detecting, by a detection module, a map match based on a time interval comprising a first duration to detect when the vehicle is on the limited access freeway or on a local roadway, and a second duration to recheck for a change in map match to detect when the vehicle is exiting from the limited access freeway to a local roadway, or the vehicle is entering the limited access freeway from the local roadway wherein when the vehicle is traveling at a greater speed, the time interval to recheck is reduced to ensure accuracy of the status of the map match with the sensed position data wherein the actuation of the autonomous operating mode feature comprises at least a map match for at least the first time duration;

comparing, by the evaluation module, the mapped location to the sensed position location by a set of comparisons of the map data to the radar data and GPS data to map data to determine a set of factors wherein each factor of the set of factors is dynamically weighted to compute a matching probability between the mapped location and the sensed location wherein the matching probability comprises a sum of each dynamically weighted factor; and summing each dynamically weighted factor to generate a summed result for comparison to a threshold wherein when the result exceeds the threshold then the evaluation module generates a signal to inhibit an autonomous operating mode feature in the vehicle from engaging as the vehicle when the summed result exceeds the threshold, the vehicle is deemed not to be operating on the limited access freeway.

10. The method of claim 9, further comprising:
receiving, by the evaluation module, image data from a camera of the vehicle for capturing images surrounding the vehicle.

11. The method of claim 10, further comprising: detecting, by the evaluation module, image data of a pedestrian by the camera of the vehicle when performing a pedestrian detection operation to determine whether the vehicle is on the local roadway when pedestrian traffic is detected.

12. The method of claim 11, further comprising:
determining, by radar, a road type by receiving data from a long range radar directed to the road surface for capturing data of the road surface.

13. The method of claim 12, further comprising:
determining, by the evaluation module from radar data, a road type by receiving radar data from a long range radar directed to the road surface for capturing radar data of the road surface.

14. The method of claim 13, further comprising:
processing by a weighting module the dynamically weighting by factors by:
  detecting, by a first factor, a pedestrian detection from the image data;
  determining, by a second factor, a road type determination from radar data for determining the road type is the limited access freeway;
  comparing, by a third factor, a comparison of the radar data and the map data for determining a tunnel within a vicinity of the vehicle; and
  comparing, by a fourth factor, a comparison of the map data and GPS data for determining an elevated freeway location within a particular distance from the vehicle.

15. The method of claim 14, wherein the first, second, third and fourth factors are assessed by the weighting module to generate results used to determine whether or not to inhibit the engaging of the autonomous operating mode feature.

16. The method of claim 10, further comprising:
controlling the weighting module and to switch a mode of operation of the autonomous operating mode feature of the vehicle based on results from an evaluation of the GPS data and an estimation error data of the vehicle.

17. The method of claim 15, further comprising:
taking an action by the evaluating module to switch the autonomous operating mode based on a condition related to the limited access freeway or the local roadway.

18. An elevated freeway detection apparatus of a vehicle for use when operating the vehicle in an autonomous mode, comprising:
a processor module, configured to receive image data, map data, GPS data, and radar data to: process the image data, map data, GPS data and radar data to: determine at least a current vehicle location; determine whether pedestrians are in a vicinity of the vehicle; and evaluate by the determinations whether the vehicle k mapped on a limited access roadway by detecting a time interval of a map match and by computing a matching probability of a distance of the vehicle to the limited access roadway based on a set of comparison operations of the map data, the GPS data, and the radar data of the vehicle to the current vehicle location wherein the processor module is configured to:

detect the map match based on the time interval comprising a first duration to detect 4 when the vehicle is on the limited access freeway or on a local roadway, and a second duration to recheck for a change in map match to detect when the vehicle is exiting from the limited access freeway to a local roadway, or the vehicle is entering the limited access freeway from the local roadway wherein when the vehicle is traveling at a greater speed, the time interval to recheck is reduced to ensure accuracy of the status of the map match with the sensed position data wherein operation of the vehicle in the autonomous mode comprises at least a map match for at least the first time duration;

compare mapped vehicle location to a sensed position location by the set of comparisons of the map data to the radar data and GPS data to map data to determine a set of factors wherein each factor of the set of factors is dynamically weighted to compute a matching probability between the mapped location and the sensed location wherein the matching probability comprises a sum of each dynamically weighted factor; and sum each dynamically weighted factor to generate a summed result for comparison to a threshold wherein when the result exceeds the threshold then the evaluation module generates a signal to inhibit an autonomous operating mode feature in the vehicle from engaging as the vehicle by when the summed result exceeds the threshold.

19. The apparatus of claim 18, further comprising:
the processor module configured to: send a signal to inhibit the autonomous mode from engaging in the vehicle when the vehicle is not within a determined distance to the limited access roadway wherein the signal is generated subsequently after an evaluation by the processor module; and switch a mode of the vehicle to inhibit the engaging of the autonomous mode wherein the switching of the mode is performed in accordance when a threshold of a map matching probability is exceeded and a position estimation error of the map data, radar data and GPS data is accounted for in the distance of the vehicle to the limited access roadway.

20. The apparatus of claim 18, further comprising:
the processor module configured to:
sum each of a weighted data of the image, radar, map and GPS data to compare results of the summed weighted data to the threshold to determine whether or not the vehicle is on the limited access freeway for operation in the autonomous mode.

\* \* \* \* \*